United States Patent [19]
Fetiveau

[11] Patent Number: 4,875,831
[45] Date of Patent: Oct. 24, 1989

[54] COMPRESSOR ROTOR BLADE HAVING A TIP WITH ASYMMETRIC LIPS

[75] Inventor: Jean Y. L. Fetiveau, Soisy sur Seine, France

[73] Assignee: Societe Nationale d'Etude et de Construction de Moteurs d'Aviation "SNECMA", Paris, France

[21] Appl. No.: 273,090

[22] Filed: Nov. 18, 1988

[30] Foreign Application Priority Data

Nov. 19, 1987 [FR] France ............................. 87 15981

[51] Int. Cl.$^4$ ............................................. F04D 29/38
[52] U.S. Cl. ..................................... 416/228; 416/224
[58] Field of Search ................................ 416/228, 224

[56] References Cited
U.S. PATENT DOCUMENTS 2,459,850 1/1949 Stine ..................................... 416/228

FOREIGN PATENT DOCUMENTS 1937395 2/1971 Fed. Rep. of Germany.
374085 2/1964 Switzerland.
475471 8/1969 Switzerland.
779591 11/1980 U.S.S.R. ............................. 416/228
193777 3/1923 United Kingdom.
2075129 11/1981 United Kingdom.

Primary Examiner—Robert E. Garrett
Assistant Examiner—John T. Kwon
Attorney, Agent, or Firm—Oblon, Spivak, McClelland, Maier & Neustadt

[57] ABSTRACT

A blade of a compressor rotor has its tip provided with at least one discontinuous sealing lip formed by two half lips arranged on opposite sides of the blade asymmetrically with respect to a transverse sectional plane of the blade tip, either with or without overlap of the half lips in the direction of the chord of the blade.

4 Claims, 2 Drawing Sheets

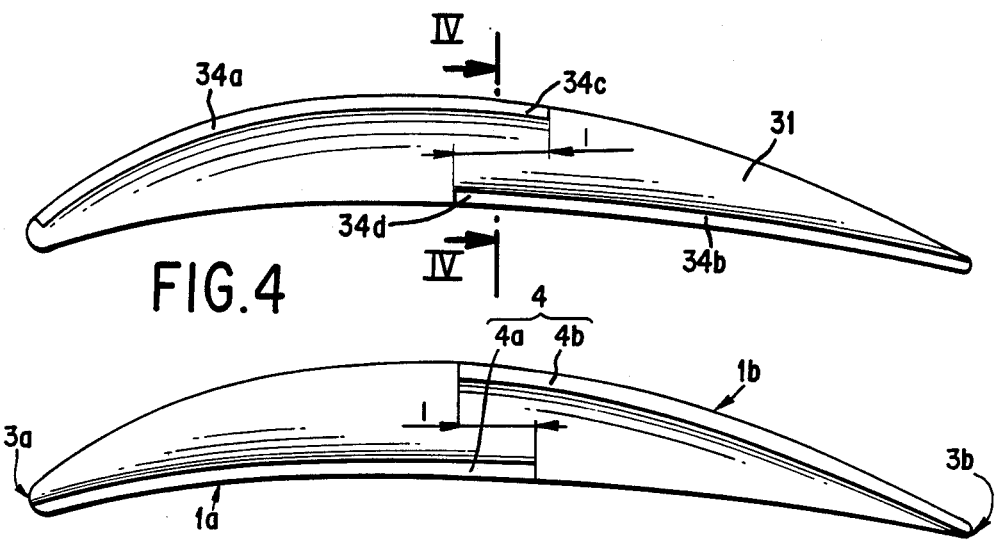
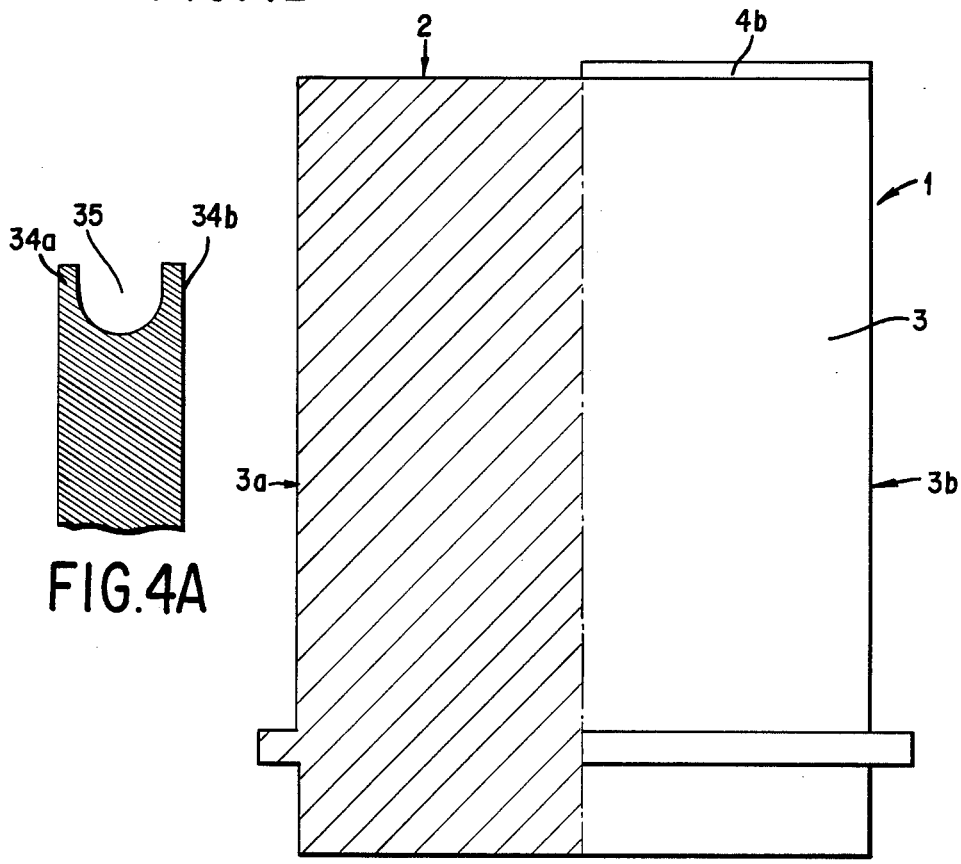

COMPRESSOR ROTOR BLADE HAVING A TIP WITH ASYMMETRIC LIPS

BACKGROUND OF THE INVENTION

1. Field of the Invention

The present invention relates to compressor blades, and in particular to the blades forming the rotor stages of a compressor in a turbo-machine.

2. Summary of the Prior Art

Research into improving compressor performance in a turbo-machine particularly compressors of the axial type, has made it necessary, in order to increase the efficiency of a compression stage constituted by movable blades, to improve the sealing at the tips of the movable blades and to ensure adjustment during operation, taking into account the various expansion factors of mechanical and thermal origin and the deformations derived from the various stresses exerted on the movable rotor parts or on the fixed parts of the associated stator. Thus, wearable sealing members, formed by linings termed "abradable", are placed on the inner surfaces of the casing facing the tips of the movable blades and, in some turbo-machine applications, the tips of the movable blades are provided with shaped elements in the form of teeth, generally called lips, which are able to cooperate with the abradable members to ensure sealing.

Moreover, depending on the operational conditions of the rotor, certain phenomena of vibrational instability of the rotor blades have been observed. In particular, fluttering vibrations may be generated by the aerodynamic flow conditions at the boundary conditions of the blade tip. In some applications, none of the solutions proposed so far is entirely satisfactory. French Patent No. 2 465 067 proposes damping the vibrations of the aerofoil portion of a blade by making a slit in the body of the aerofoil portion, trailing edge side, extending from the free tip towards the root of the blade. The aim of the invention is directed rather towards avoiding the development of vibrations by modifying the aerodynamic conditions at the tip of a blade.

SUMMARY OF THE INVENTION

According to the invention, there is provided a compressor rotor blade wherein the tip of said blade is provided with at least one discontinuous sealing lip, said lip consisting of two half lips which are arranged one at each side of said blade in an asymmetrical manner with respect to a transverse sectional plane of said blade tip.

The geometrical and structural asymmetry thus obtained induces an aerodynamic asymmetry which modifies the boundary conditions at the tip of the rotor blade, and also modifies the sensitive frequencies of the blade. This enables fluttering vibrations to be be eliminated under the same conditions of use. This adaptation of the rotor blades may be applied advantageously without any other repercussions on the definition of the blade.

Depending on the conditions particular to each application and on the results obtained, several advantageous methods of putting the invention into practice may be considered. For example, one of the half lips may be located on the concave side of the blade towards the leading edge, while the other half lip is located on the convex side towards the trailing edge, or these respective positions may be reversed.

Also, the two half lips on opposite sides of the blade may or may not overlap each other in the direction of the chord of the blade.

Other characteristics and advantages of the invention will become apparent from the following description of embodiments of the invention with reference to the accompanying drawings.

BRIEF DESCRIPTION OF THE DRAWINGS

FIG. 4 is a top plan view of the tip of a fourth example of a compressor rotor blade in accordance with the invention, which is another variation of the second example shown in FIG. 2;

FIG. 4a is a transverse section through the tip of the blade shown in FIG. 4, taken along the line IV—IV of FIG. 4;

FIG. 4b is a top plan view of the tip of a fifth example of a compressor rotor blade in accordance with the invention, which is another variation of the first example shown in FIG. 1; and FIG. 5 is a part sectional, part elevational view of the compressor blade shown in FIG. 1, taken along line V—V of FIG. 1.

DESCRIPTION OF THE PREFERRED EMBODIMENTS

Figure 1:
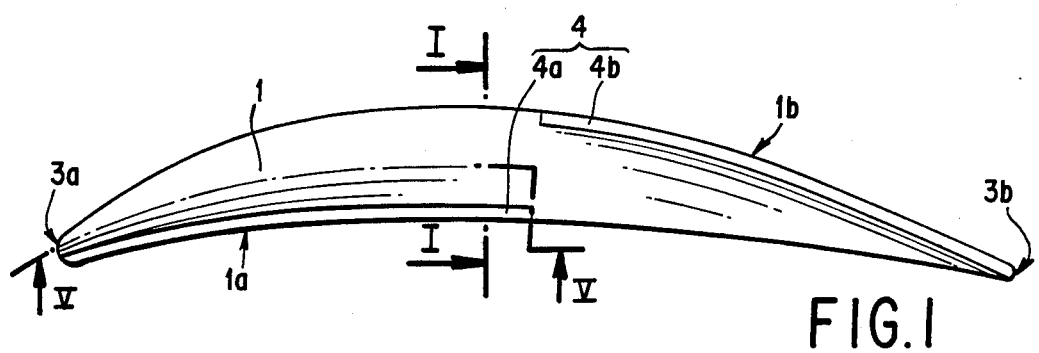
FIG. 1 is a top plan view of the tip of a first example of a compressor rotor blade in accordance with the invention.
Figure 1A:
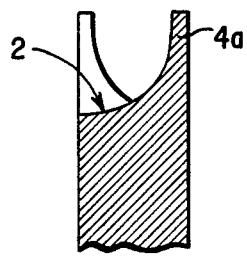
FIG. 1a is a transverse section through the tip of the blade shown in FIG. 1, taken along the line I—I of FIG. 1.

In FIGS. 1, 1a and 5, a blade 1 of a rotor stage of a turbo-machine compressor is shown in which the free tip 2 of the aerofoil portion 3 of the blade 1 is provided with a discontinuous lip 4 consisting of two parts or half-lips 4a and 4b arranged so as to introduce asymmetry into the blade tip 2. A first of the half-lips 4a is situated at the concave side 1a of the blade and extends from the leading edge 3a of the blade to the vicinity of the median plane perpendicular to the chord of the blade, and the second half lip 4b is situated at the convex side 1b of the blade 1 and extends from the median plane to the trailing edge 3b of the blade.

Figure 2:
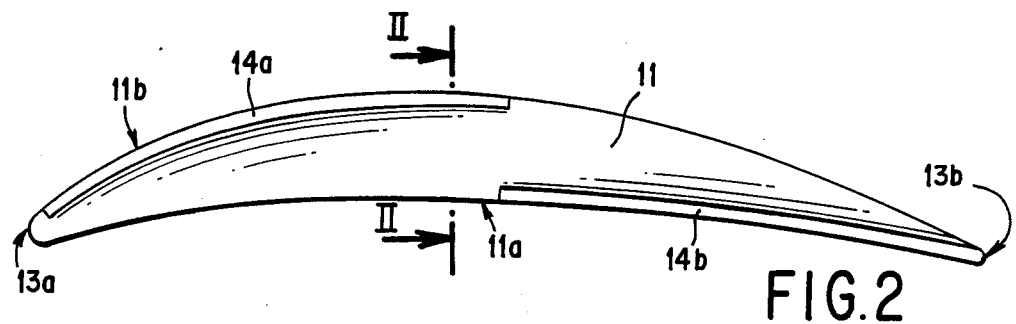
FIG. 2 is a top plan view of the tip of a second example of a compressor rotor blade in accordance with the invention.
Figure 2A:
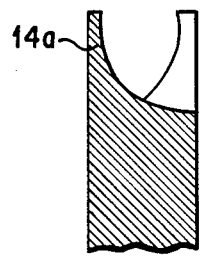
FIGS. 2a is a transverse section through the tip of the blade shown in FIG. 2, taken along the line II—II of FIG. 2.

In a second embodiment of the invention shown in FIGS. 2 and 2a, the first half lip 14a is situated at the convex side 11b of the rotor blade 11 and extends from the leading edge 13a of the blade to the vicinity of the median plane, and the second half lip 14b is situated at the concave side 11a of the blade and extends from the median plane to the trailing edge 13b.

Figure 3:
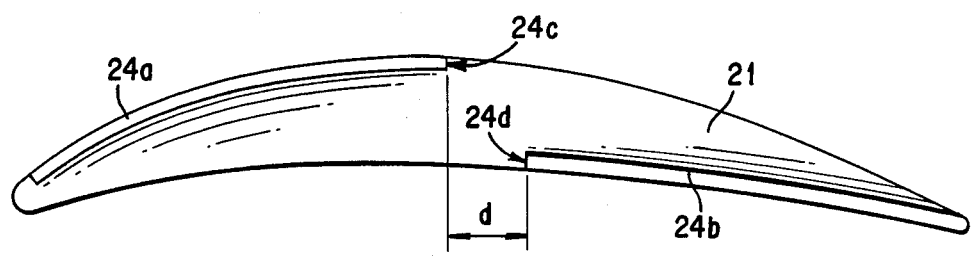
FIG. 3 is a top plan view of the tip of a third example of a compressor rotor blade in accordance with the invention, which is a variation of the second example shown in FIG. 2.

FIG. 3 shows an alternative arrangement of the second embodiment shown in FIGS. 2 and 2a, in which the inner ends 24c and 24d of the half lips 24a and 24b respectively do not reach the median plane of the blade 21 and define a gap d in the direction of the chord of the blade.

FIG. 4 shows another alternative arrangement of the second embodiment shown in FIGS. 2 and 2a, in which the inner ends 34c and 34d of the half lips 34a and 34b respectively overlap by a length 1 in the direction of the chord of the blade 31. The flow conditions at the tip of the blade 31 are thus modified by the creation of a mini-channel 35, thus modifying the stray flows at the blade tip and the boundary conditions of flow.

Naturally, the alternative arrangements of FIGS. 3 and 4 which are shown applied to the second embodiment of FIGS. 2 and 2a, may also be applied to the first embodiment shown in FIGS. 1 and 1a as shown in FIG. 4b.

I claim:

1. A compressor rotor blade wherein the tip of said blade is provided with at least one discontinuous sealing lip, said lip consisting of two half lips which are arranged one at each side of said blade in an assymetrical manner with respect to a transverse sectional plane of said blade tip, wherein a first one of said two half lips is located on the concave side of said blade and extends from the leading edge of said blade to the vicinity of the median plane perpendicular to the chord of said blade, and a second one of said half lips is located on the convex side of said blade and extends from said median plane to the trailing edge of said blade.

2. A compressor rotor blade according to claim 1, wherein said two half lips overlap each other by a length 1 in the direction of the chord of said blade whereby each of said half lips has a part spaced from and facing a part of the other of said half lips across said blade.

3. A compressor rotor blade wherein the tip of said blade is provided with at least one discontinuous sealing lip, said lip consisting of two half lips which are arranged one at each side of said half blade in an asymmetrical manner with respect to a transverse sectional plane of said blade tip, wherein each of said two half lips has no part facing any part of the other of said half lips across said blade.

4. A compressor rotor blade according to claim 3, wherein said two half lips are spaced from each other by a distance d in the direction of the chord of said blade.

* * * * *

UNITED STATES PATENT AND TRADEMARK OFFICE
CERTIFICATE OF CORRECTION

PATENT NO. : 4,875,831

DATED : OCTOBER 24, 1989

INVENTOR(S) : JEAN Y. L. FETIVEAU

It is certified that error appears in the above-identified patent and that said Letters Patent is hereby corrected as shown below:

Column 1, line 56, delete "be" (second occurence).

Column 3, line 4, change "1" to --$\underline{1}$--.

Column 4, line 14, delete "half";

Signed and Sealed this

Fifth Day of March, 1991

*Attest:*

HARRY F. MANBECK, JR.

*Attesting Officer*      *Commissioner of Patents and Trademarks*